Patented Apr. 30, 1935

1,999,175

UNITED STATES PATENT OFFICE 1,999,175

PLASTIC LUTING COMPOSITION

Emil C. Johnson, Falconer, N. Y.

No Drawing. Application April 2, 1931,
Serial No. 527,368

1 Claim. (Cl. 106—33)

This invention relates to a composition material for filling nail holes, cracks, mitered joints, cavities or any imperfections in wood, plaster, metal or the equivalent and for glazing purposes.

It is especially aimed to provide such a material as will remain permanently when applied, without danger of shrinking, becoming brittle, or hardening to an extent to destroy the adhesion or bond with the wood or metal, and which will immediately after application, take any ornamental finish such as all colors of paint, stain, shellac, lacquer varnish or the like, without detection on the finished product.

I further aim to provide a material for the purposes mentioned which may be applied cold or "burnt in" as preferred and applied in a heated condition when used for glazing purposes.

In addition, it is a desideratum to produce the material in a substantially solid form, that is as a block or body of any desired shape, for instance, square or rectangular for general purposes, and preferably in strips of triangular cross-section for glazing purposes.

Another aim is to provide a material for the purposes mentioned which may be worked with an ordinary jackknife point either cold or heated.

In carrying out the invention, the following ingredients are used:

Beeswax or equivalent _____ pound __ 1
Fine ground whiting, flour or other inert
  filler _____ pounds __ 2
Spar varnish _____ ounce __ 1
Carnauba wax _____ ounce __ 1
Coloring such as burnt umber or raw sienna
  either in powdered or oil-paste condition The various ingredients are thoroughly mixed together and in final form the mass is molded and will remain in molded or solid condition, such as a square or rectangular, or triangular strips, although no limitation to any specific form is made.

The material may be applied by a jackknife point or special knife either cold or hot, to wood before or after the usual sandpapering thereof in the manufacture of furniture.

It may also be applied to the wood or metal after the same has been painted or equivalently first treated. Since the material will take any color, application thereof after painting of the wood or metal cannot be detected when the work is completed.

When the material is used for glazing purposes, it is produced in strips usually triangular in cross section, which strips are heated as over a flame and then applied in the position usually occupied by putty and pressed against the glass and the frame whether of wood or metal. Thorough adhesion results forming a watertight joint and one which will not crack, dry or fall out, and generally overcomes the objections to putty. As well, the material may also be used for glazing purposes from mass form, by use of a putty knife or equivalent.

The spar varnish is used to temper the consistency of the mass and also for its adhesive qualities.

The carnauba or equivalent wax is used as a hardening agent and the amount of the same may be varied at will or omitted entirely, although as good results would not ensue. The proportions and relation of the carnauba wax and varnish may be varied as desired for specific work.

The filler or material disclosed herein will not be injuriously affected but will remain permanent, efficient and unaffected when work to which it has been applied is subjected to temperatures considerably above normal.

Various changes may be resorted to within the spirit and scope of the invention.

I claim as my invention.

A plastic composition suitable for luting consisting essentially of beeswax, one pound; spar varnish, one ounce; a hardening wax, one ounce, and inert filler, two pounds.

EMIL C. JOHNSON.